May 19, 1925.  
C. N. TEETOR  
RECIPROCATING MECHANISM  
Filed Feb. 19, 1923  
1,538,525
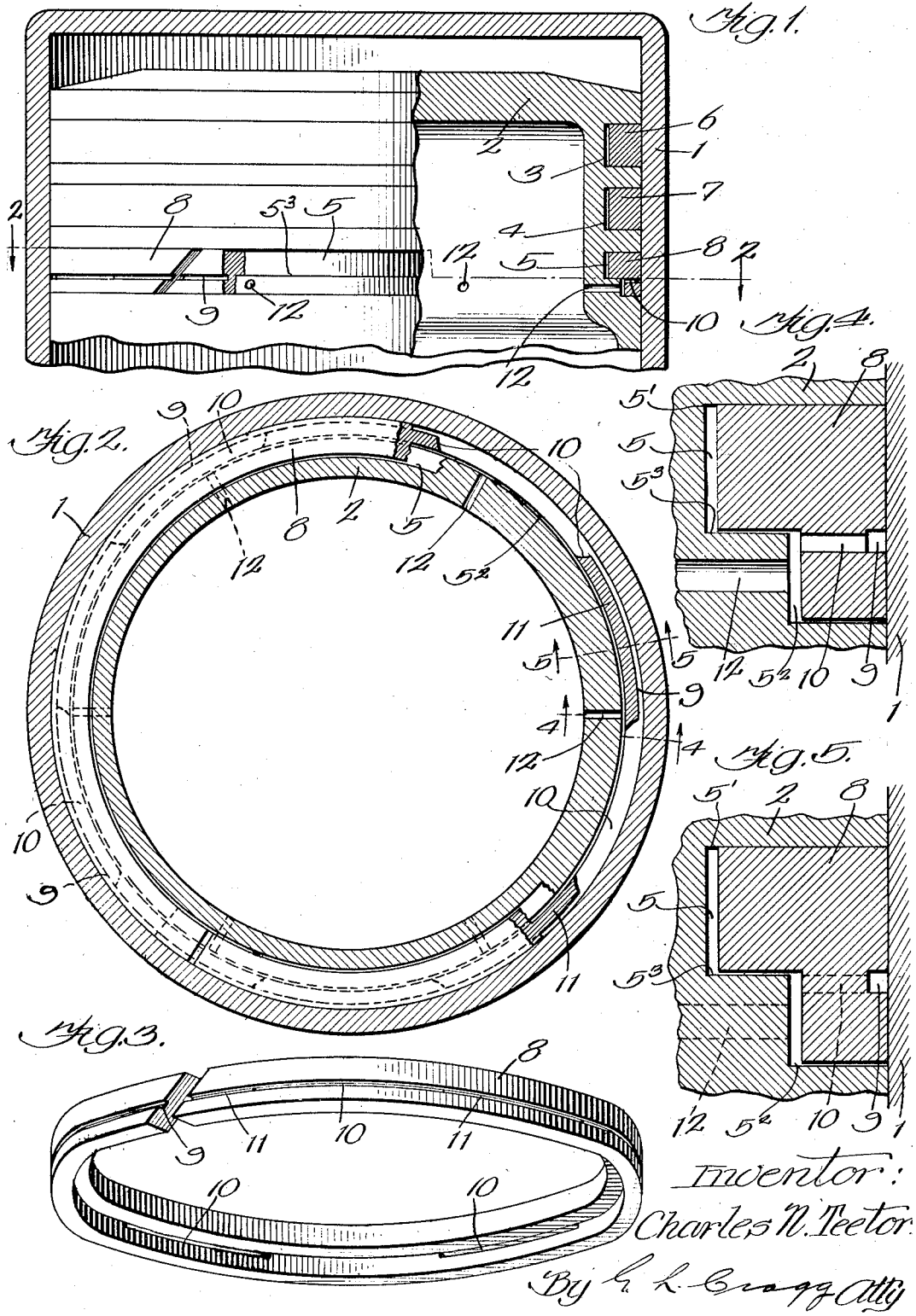

Patented May 19, 1925.

1,538,525

UNITED STATES PATENT OFFICE.

CHARLES N. TEETOR, OF HAGERSTOWN, INDIANA.

RECIPROCATING MECHANISM.

Application filed February 19, 1923. Serial No. 619,849.

*To all whom it may concern:*

Be it known that I, CHARLES N. TEETOR, a citizen of the United States, residing at Hagerstown, in the county of Wayne and State of Indiana, have invented a certain new and useful Improvement in Reciprocating Mechanism, of which the following is a full, clear, concise, and exact description.

My invention relates to reciprocating mechanism employing cylinders, hollow pistons in the cylinders and having piston ring receiving grooves. It is the general object of my invention to provide trapped spaces between inner portions of the piston rings and the pistons for containing bodies of lubricating oil and serving to prevent the passage, where such bodies of lubricating oil are located, of the operating fluid which is employed in the operation of the reciprocating mechanism, such, for example, as gas in internal combustion engines. In accordance with my invention a copious flow of lubricant is permitted in the neighborhood of the trapped bodies of oil, there being provision for very slight seepage of oil into these trapped spaces to maintain the bodies of lubricant therein intact.

In carrying out my invention the circumscribing piston ring receiving groove in the piston has circumscribing portions of different diameters in neighboring zones and has a surface portion angular to the axis of the piston and located between the curved inner sides of said circumscribing groove portions. In the preferred embodiment of the invention this angular surface portion is preferably perpendicular to the axis of the piston and is located immediately between and joins the curved inner sides of the circumscribing grooved portions of the piston groove. The inner side of the piston ring groove is shaped substantially to conform to the base of the piston groove, the piston having a passage positioned to establish communication between the interior of the piston and one of said circumscribing groove portions, said ring having a circumscribing groove and passages therethrough establishing communication between this groove and the last mentioned portion of the piston groove.

In the preferred embodiment of the invention the piston groove and piston ring are dimensioned to minimize the space between the aforesaid angular surface portion of the piston groove and the opposing surface portion of the piston ring to have the spaces between the curved inner sides of said piston groove portions and the opposing curved surfaces of the ring wider than the other space in order substantially to trap the lubricating oil in the space that is trapped by the imperforate portion of the piston ring and to afford a copious flow in the space defined by the perforated portion of the ring from which lubricant may seep to the trapped space to maintain the sealing body of lubricant intact.

I will explain my invention more fully by reference to the accompanying drawing in which Fig. 1 is a sectional view illustrating a portion of an engine cylinder, a portion of a piston in the cylinder, and piston rings in the piston grooves that are formed in the piston: Fig. 2 is a sectional view on line 2—2 of Fig. 1; Fig. 3 is a perspective view illustrating the preferred form of piston ring shown in Figs. 1 and 2; and Figs. 4 and 5 are sectional views taken respectively on lines 4—4 and 5—5 of Fig. 2 on a large scale.

Like parts are indicated by similar characters of reference throughout the different figures.

My invention is of particular service in connection with internal combustion hydrocarbon engines, though the invention is not to be thus restricted.

The engine cylinder 1 may be of any suitable type, the engine cylinder usually communicating at its inner end with the crank case containing a bath of lubricating oil from which working parts of the engine are supplied. The piston 2 is of any suitable or usual form, having one or more annular piston ring grooves 3, 4, 5 that receive piston rings 6, 7, 8. The piston ring groove 5 is nearest the crank case and this groove contains a piston ring of my invention, it being unnecessary to provide such a piston ring in the other piston ring grooves of the piston. The innermost piston ring 8 is formed with an annular groove 9 in a zone of the piston ring that is parallel to and midway between the inner and outer flat sides of the ring. Elongated slots or passages 10 are preferably formed in the piston ring and are disposed in the zone that contains the annular groove 9. These slots are preferably narrower than the groove 9 and diverge outwardly to promote the reception of lubricating oil into the slots and to establish full flow of the lubricant through the inner ends of the slots into the space between the piston ring and the curved base of the groove 5 that is faced by the inner curved surfaces of the ring.

Lubricating oil is scraped from the inner cylindrical surface of the cylinder and finds entry into the groove 9 at the places between the slots 10 and also where these slots are located. The lubricant will not only find passage in a peripheral direction from the portions of the groove 9 that are between the slots but will also find passage in a peripheral direction along the long sides of the slots and also crosswise of the groove 9 into said slots whereby the flow of lubricant from the groove 9 through the ring is made copious and uniform. The oil finding entry to the interior of the ring through the inner and narrower ends of the slots will work its way circumferentially in the zone of the ring to form suitable packing between the solid portions 11 of the ring and the piston. The passages 12 in the piston lead from the groove 5 into the interior of the piston and serve to convey lubricant back to the crank case. These passages are preferably restricted in relation to the slots 10 so that the return flow of lubricant to the crank case will not be too rapid, yet copious enough to maintain proper circulation of the lubricant.

In accordance with my present invention the circumscribing piston ring receiving groove 5 has circumscribing portions 5', 5² of different diameters in neighboring and preferably contiguous zones. The groove 5 has a surface portion 5³ angular and preferably perpendicular to the axis of the piston, this surface portion 5³ being located between and desirably joining the curved sides of the circumscribing groove portions 5', 5². The piston ring 8 received in the groove is desirably of L-shape upon its inner side to have this side to conform substantially to the L-shaped base of the piston groove. The passages 10 in the ring are in the thinner branch of the ring to establish communication between the piston ring groove 9 and the shallower portion of the piston ring receiving groove 5². The oil trapped in the groove portion 5' is sufficient to seal this groove portion against the passage of engine propelling fluid. The space between the angular surface 5³ and the opposing flat surface at the shoulder of the ring is, say one-ten thousandths of an inch, the width of the spaces 5' 5² being say ten times as much. The narrower space permits of the passage of sufficient oil into the space 5' to keep the oil in this space replenished, the oil that is thus supplied to the space 5' being derived from a comparatively copious stream of oil flowing through the spaces 9, 10, 5² and 12.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a reciprocating mechanism, the combination with a cylinder; of a hollow piston in the cylinder and formed with a circumscribing piston ring receiving groove having circumscribing portions of different diameters and depths in neighboring zones and having a surface portion angular to the axis of the piston and located between and joining the curved inner sides of said circumscribing groove portions; and a piston ring received in said groove and whose inner side is shaped substantially to conform to the base of the piston groove, the piston having a passage positioned to establish communication between the interior of the piston and the shallower one of said circumscribing groove portions, said ring having a circumscribing groove and passages therethrough establishing communication between this groove and the shallower portion of the piston groove.

2. In a reciprocating mechanism, the combination with a cylinder; of a hollow piston in the cylinder and formed with a circumscribing piston ring receiving groove having circumscribing portions of different diameters and depths in contiguous zones and having a surface portion substantially perpendicular to the axis of the piston and located between and joining the curved inner sides of said circumscribing groove portions; and a piston ring received in said groove and whose inner side is shaped substantially to conform to the base of the piston groove, the piston having a passage positioned to establish communication between the interior of the piston and the shallower one of said circumscribing groove portions, said ring having a circumscribing groove and passages therethrough establishing communication between this groove and the shallower portion of the piston groove.

3. In a reciprocating mechanism, the combination with a cylinder; of a hollow piston in the cylinder and formed with a circumscribing piston ring receiving groove having circumscribing portions of different diameters in neighboring zones and having a surface portion angular to the axis of the piston and located between the curved inner sides of said circumscribing groove portions; and a piston ring received in said groove and whose inner side is shaped substantially to conform to the base of the piston groove, the piston having a passage positioned to establish communication between the interior of the piston and one of said circumscribing groove portions, said ring having a circumscribing groove and passages therethrough establishing communication between this groove and the last mentioned portion of the piston groove, the piston groove and piston ring being dimensioned to minimize the space between said angular surface portion of the piston groove and the opposing surface portion of the piston ring and to have the spaces between the curved inner sides of said piston groove portions and the opposing curved surfaces of the ring wider than the other space.

4. In a reciprocating mechanism, the combination with a cylinder; of a hollow piston in the cylinder and formed with a circumscribing piston ring receiving groove having circumscribing portions of different diameters in contiguous zones and having a surface portion substantially perpendicular to the axis of the piston and located between and joining the curved inner sides of said circumscribing groove portions; and a piston ring received in said groove and whose inner side is shaped substantially to conform to the base of the piston groove, the piston having a passage to establish communication between the interior of the piston and one of said circumscribing groove portions, said ring having a circumscribing groove and passages therethrough establishing communication between this groove and the last mentioned portion of the piston groove, the piston groove and piston ring being dimensioned to minimize the space between said perpendicular surface portion of the piston groove and the opposing surface portion of the piston ring and to have the spaces between the curved inner sides of said piston groove portions and the opposing curved surfaces of the ring wider than the other space.

5. In a reciprocating mechanism, the combination with a cylinder; of a hollow piston in the cylinder and formed with a circumscribing piston ring receiving groove having circumscribing portions of different diameters and depths in neighboring zones and having a surface portion angular to the axis of the piston and located between and joining the curved inner sides of said circumscribing groove portions; and a piston ring received in said groove and whose inner side is shaped substantially to conform to the base of the piston groove, the piston having a passage positioned to establish communication between the interior of the piston and the shallower one of said circumscribing groove portions, said ring having a circumscribing groove and passages therethrough establishing communication between this groove and the shallower portion of the piston groove, the piston groove and piston ring being dimensioned to minimize the space between said angular surface portion of the piston groove and the opposing surface portion of the piston ring and to have the spaces between the curved inner sides of said piston groove portions and the opposing curved surfaces of the ring wider than the other space.

6. In a reciprocating mechanism, the combination with a cylinder; of a hollow piston in the cylinder and formed with a circumscribing piston ring receiving groove having circumscribing portions of different diameters and depths in contiguous zones and having a surface portion substantially perpendicular to the axis of the piston and located between and joining the curved inner sides of said circumscribing groove portions; and a piston ring received in said groove and whose inner side is shaped substantially to conform to the base of the piston groove, the piston having a passage positioned to establish communication between the interior of the piston and the shallower one of said circumscribing groove portions, said ring having a circumscribing groove and passages therethrough establishing communication between this groove and the shallower portion of the piston groove, the piston groove and piston ring being dimensioned to minimize the space between said perpendicular surface portion of the piston groove and the opposing surface portion of the piston ring and to have the spaces between the curved inner sides of said piston groove portions and the opposing curved surfaces of the ring wider than the other space.

In witness whereof, I hereunto subscribe my name this 14th day of February, A. D. 1923.

CHARLES N. TEETOR.